US008712614B2

(12) United States Patent
Parker

(10) Patent No.: US 8,712,614 B2
(45) Date of Patent: Apr. 29, 2014

(54) SYSTEM, METHOD, AND COMPUTER READABLE MEDIUM FOR A FORCE-BASED WHEELCHAIR JOYSTICK

(76) Inventor: Andrew Parker, Houston, TX (US)

( * ) Notice: Subject to any disclaimer, the term of this patent is extended or adjusted under 35 U.S.C. 154(b) by 20 days.

(21) Appl. No.: 13/068,053

(22) Filed: Apr. 29, 2011

(65) Prior Publication Data

US 2011/0270478 A1 Nov. 3, 2011

Related U.S. Application Data

(60) Provisional application No. 61/329,168, filed on Apr. 29, 2010.

(51) Int. Cl.
*B60L 15/00* (2006.01)

(52) U.S. Cl.
USPC .......... 701/22

(58) Field of Classification Search
None
See application file for complete search history.

(56) References Cited

U.S. PATENT DOCUMENTS

| | | | | |
|---|---|---|---|---|
| 3,445,683 | A * | 5/1969 | Traina | 327/445 |
| 5,610,810 | A * | 3/1997 | Nagahira et al. | 700/56 |
| 5,648,708 | A * | 7/1997 | Littlejohn | 318/488 |
| 5,918,195 | A * | 6/1999 | Halgrimson et al. | 702/94 |
| 5,961,561 | A * | 10/1999 | Wakefield, II | 701/31.4 |
| 6,445,597 | B1 * | 9/2002 | Boylan et al. | 363/21.06 |
| 6,505,108 | B2 * | 1/2003 | Bodie et al. | 701/41 |
| 6,782,351 | B2 * | 8/2004 | Reichel et al. | 702/188 |
| 7,418,302 | B2 * | 8/2008 | Gharsalli | 700/72 |
| 7,752,511 | B2 * | 7/2010 | Fulton et al. | 714/725 |
| 7,768,386 | B2 * | 8/2010 | Hayter et al. | 340/501 |
| 7,969,288 | B2 * | 6/2011 | Braun et al. | 340/407.1 |
| 7,996,158 | B2 * | 8/2011 | Hayter et al. | 702/23 |
| 8,267,206 | B2 * | 9/2012 | Vogel et al. | 180/19.3 |
| 2002/0128760 | A1 * | 9/2002 | Bodie et al. | 701/37 |
| 2007/0005183 | A1 * | 1/2007 | Gharsalli | 700/224 |
| 2007/0225891 | A1 * | 9/2007 | Saposnik | 701/93 |
| 2008/0027597 | A1 * | 1/2008 | Barrett et al. | 701/21 |
| 2009/0153370 | A1 * | 6/2009 | Cooper et al. | 341/21 |

OTHER PUBLICATIONS

Micro Extremity Control, Driver Control Packages—100 Series, Product Catalog, Switch Laboratories, Inc., 2004-2009, 1 pg.
Mini Joystick, Document No. 0001-8001b-0101a, HMC International NV, 6 pgs.

* cited by examiner

*Primary Examiner* — John R Olszewski
*Assistant Examiner* — Jean-Paul Cass
(74) *Attorney, Agent, or Firm* — Buskop Law Group, PC; Wendy Buskop

(57) ABSTRACT

An interface for use with a pressure-based wheelchair joystick, which enables highly sensitive calibration of the pressure-based joystick, and allows the user to control the wheelchair.

3 Claims, 3 Drawing Sheets

SYSTEM, METHOD, AND COMPUTER READABLE MEDIUM FOR A FORCE-BASED WHEELCHAIR JOYSTICK

PRIORITY

This application is a non-provisional of and claims priority to U.S. Provisional Application No. 61/329,168 entitled, "SYSTEM AND METHOD FOR A FORCE BASED WHEELCHAIR JOYSTICK," filed Apr. 29, 2010, also naming Andrew Parker as sole inventor, the disclosure of which is hereby incorporated by reference in its entirety.

FIELD OF THE INVENTION

The present invention relates generally to mechanisms for controlling wheelchairs and, more specifically, to a highly sensitive and durable force-based joystick for wheelchairs.

BACKGROUND

Many individuals with muscular degenerative disabilities are confined to wheelchairs. Due to their limited mobility and lack of muscular strength, the wheelchairs are equipped with joysticks to control their operation. These conventional joysticks typically use Hall Effect technology which requires displacement of the joystick to effect movement of the chair. Typically, a hand, chin, or tongue are used to displace the joystick. Due to their degenerative conditions, those with disabilities often become fatigued on account of prolonged use of the prior art displacement-based joysticks.

In addition, conventional miniature joysticks are fragile. During use, the user may encounter bumps or other obstructions which can result in the joystick coming into contact with their hand or chin. As a result, the joysticks can be damaged, and they are quite costly to replace (e.g., $600 dollars or more). Although some conventional joysticks have plastic enclosures, they are known in the industry as lacking durability.

In view of the foregoing, there is a need in the art for a durable and sensitive wheelchair joystick with does not require displacement to effect movement of the wheelchair.

SUMMARY OF THE INVENTION

Exemplary embodiments and methodologies of the present invention provide an interface for use with a pressure-based wheelchair joystick. The interface comprises circuitry which enables highly sensitive calibration of the pressure-based joystick, and allows the user to control the wheelchair thereafter. The present invention also provides a protective sleeve for the pressure-based joystick, thereby providing increased durability.

DESCRIPTION OF ILLUSTRATIVE EMBODIMENTS

Illustrative embodiments and related methodologies of the present invention are described below as they might be employed in a force based wheelchair joystick and related methods. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the invention will become apparent from consideration of the following description and drawings.

Figure 1:
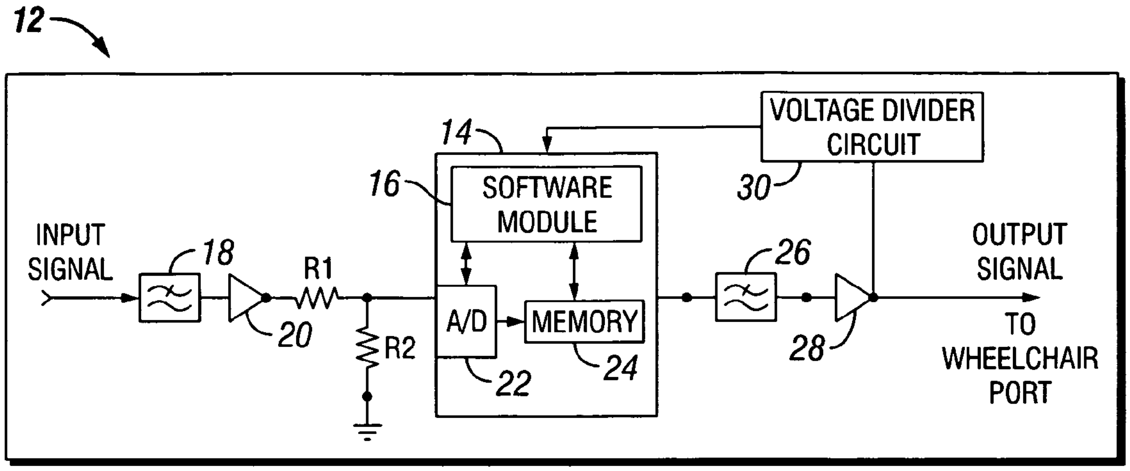
FIG. 1 is a block diagrammatic view of circuitry of an interface for a force based joystick according to an exemplary embodiment of the present invention.

FIG. 1 illustrates an exemplary embodiment of the present invention having a force based joystick 10 (not shown) and wheelchair interface 12. Joystick 10 is a pressure-based joystick, such as a piezo resistive joystick, for example, which may be controlled by digital and analog electronics. When used in conjunction with the present invention, a pressure-based joystick alleviates the fatigue associated with prolonged use of prior art systems using displacement-based joysticks. Those ordinarily skilled in the art having the benefit of this disclosure realize that other pressure-based joysticks may also be used with the present invention.

Interface 12 contains a microcontroller 14, which can be a MICROCHIP brand DSPIC30F3012™, for example. Software 16 stored on the microcontroller 14 comprises a calibration module and operation module which, as will be described, control the calibration joystick 10 and the normal operation of the wheelchair, respectively. As understood in the art, microcontroller 14 implements software 16 which can be stored on microcontroller 14 or in some form of memory. During, operation, microcontroller 14 processes signals received from joystick 10, via illustrated circuitry, and transmits movement instructions to the wheelchair port (not shown), which results in movement of the wheelchair.

Figure 2:
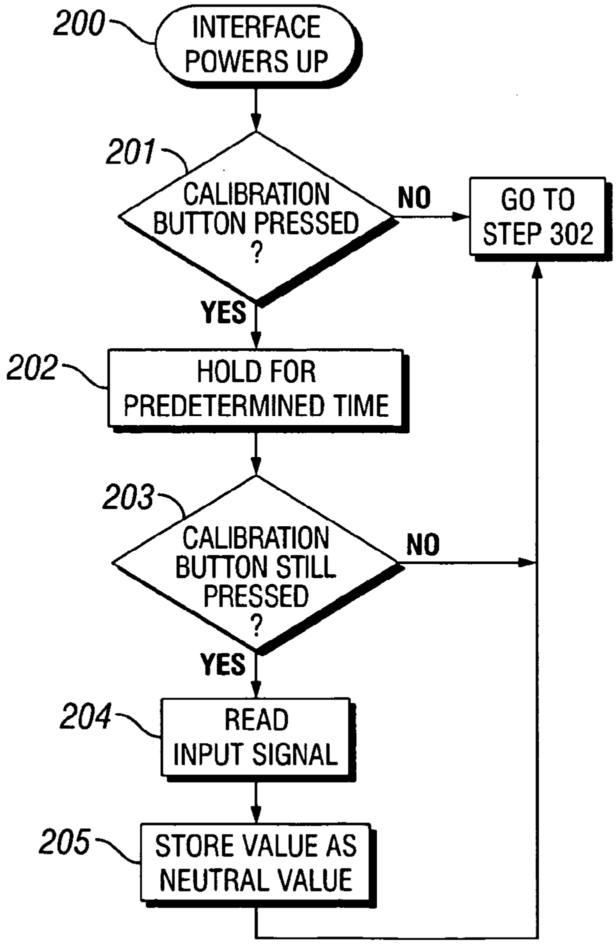
FIG. 2 is a flow chart illustrating a joystick calibration process according to an exemplary methodology of the present invention.

FIG. 2 illustrates a calibration flow chart according to an exemplary methodology of the present invention. As previously mentioned, microcontroller 14 performs the methodologies disclosed herein via implementation of software 16. At step 200, interface 12 is powered up by, for example, switching the wheelchair to an "on" position. At step 201, microcontroller 14 determines whether the calibration button located on interface 12 has been pressed by continually reading the voltage signal sent from the calibration button (not shown). If the button has been pressed, microcontroller 14 then pauses for a predetermined period of time, typically a few seconds (step 202). If the calibration button has not been pressed, microcontroller 14 goes into regular operation mode at step 302, as will be described in relation to FIG. 3.

At step 203, after pausing, microcontroller 14 then determines whether the calibration button has been pressed for the predetermined period of time, typically a few seconds. If it has been pressed for the specified time period, microcontroller 14 then reads the output signal of joystick 10 (i.e., the INPUT signal) at step 204. Referring to FIG. 1, the INPUT signal then first passes though a low pass active noise filter 18 and a unity gain buffer (not shown), which ensures a clean signal is received at microcontroller 14. In this exemplary embodiment, low pass filter 18 filters out frequencies above 40 Hz and comprises a Sallen Key Filter. Low pass filter 18 is used to combat the electrostatic noise created by the wheelchair motor. Thereafter, the INPUT signal is passed through amplifier 20 which, for example, is a unity gain amplifier which buffers the signal to give the microcontroller 14 a low impedance signal. The filtered INPUT signal is then read by microcontroller 14 via its 12 bit A/D converter peripheral 22.

At this step, note the user has not moved joystick 10—it is resting in its neutral position. At step 305, the digital value of the INPUT signal is then stored in memory 24 as the initial neutral values for each axis of joystick 10. Joystick 10 is now calibrated and is ready to being normal operation as will be described in relation to FIG. 4. Before each subsequent use of joystick 10, microcontroller 14 recalls the stored neutral value from memory 24. Whenever INPUT signals are read from joystick 10, they will be compared to this stored initial neutral value. Using software module 16, microcontroller 14 will send the wheelchair signals to stop when the received INPUT signal is within plus or minus 20 A/D converter counts of the initial neutral value, which equates to plus or minus 24 mV. This 48 mV deadband allows for temperature compensation and joystick degradation. When the INPUT signal is within this range, software module 16 sends a STOP signal to the wheelchair indicating the chair is in a neutral position.

In this exemplary embodiment, the 48 mV deadband enables joystick 10 to be highly sensitive to pressures applied by the user. Joystick 10 may be re-calibrated at any time by simply pressing the calibration button, as described. As such, an number of joysticks, which are all slightly different, may be used with the same wheelchair and retain the sensitivity provided by the present invention.

Figure 3:
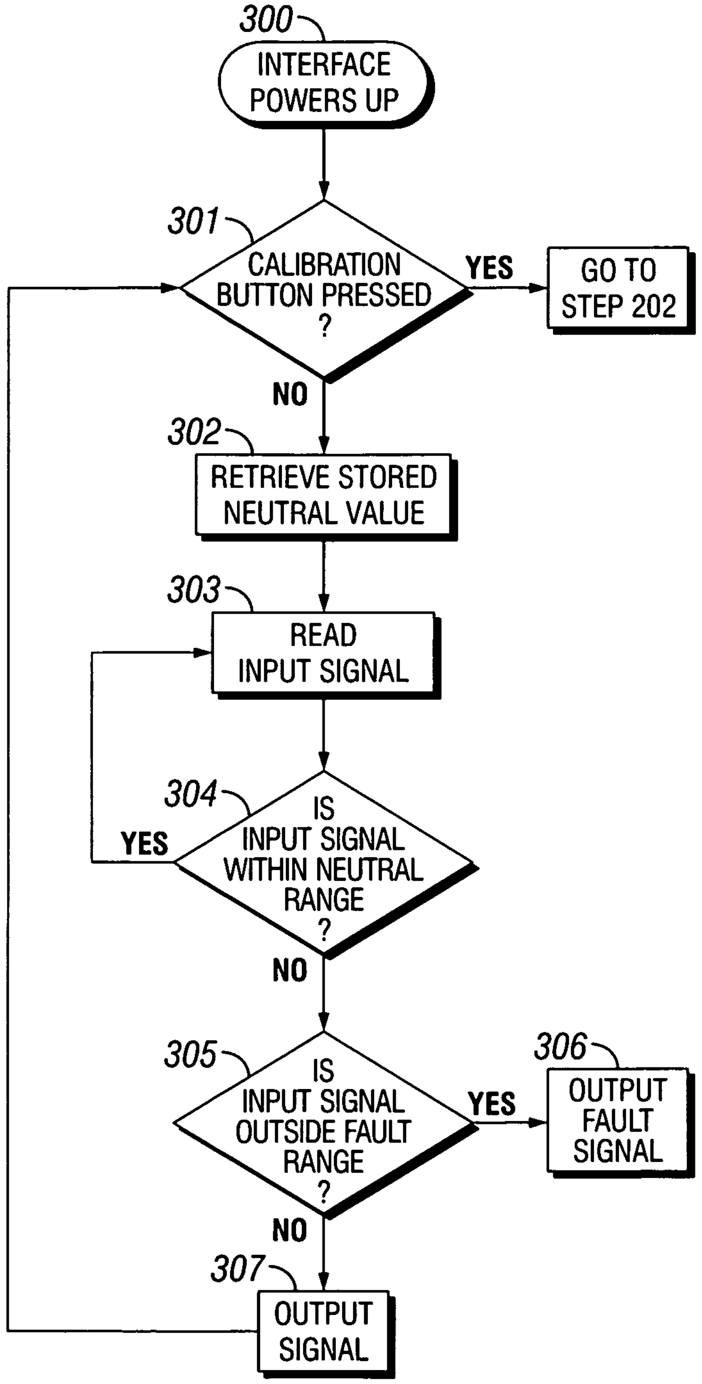
FIG. 3 is a flow chart illustrating an operational process according to an exemplary methodology of the present invention.

FIG. 3 illustrates an operational flow chart according to an exemplary methodology of the present invention. At step 300, interface 12 is powered up by, for example, switching the wheelchair to an "on" position. During operation, low pass filter 18 continuously feeds A/D converter 22 with the voltage signals of joystick 10 (via INPUT signal). At step 301, utilizing software module 16, microcontroller 14 determines whether the calibration button (not shown) located on interface 12 has been pressed by reading the corresponding signal as previously described. If the button has been pressed, microcontroller 14 goes to step 202 of FIG. 2. If the calibration button has not been pressed, microcontroller 14 retrieves the previously stored neutral position value of joystick 10 from memory 24 at step 302. At step 303, microcontroller 14 also reads the INPUT signal received from joystick 10 and the sensitivity potentiometer (not shown), forming part of joystick 10.

At step 304, using software module 16, microcontroller 14 compares the INPUT signal with the stored neutral values to determine whether those read values, of the INPUT signal, are outside the specified voltage range, which is +/− 24 mV of the initial value in this exemplary embodiment. Note, however, those ordinarily skilled in this art having the benefit of this disclosure realize that other deadband ranges may be utilized as desired. If the value of the INPUT signal is within the 48 mV deadband range, microcontroller 14 interprets this as the neutral position and instructs the wheelchair not to move. Thereafter, a feedback loop is utilized by software module 16 and microcontroller waits for the next INPUT signal.

If the INPUT signal is outside the range, microcontroller then determines whether the INPUT signal is within a predetermined fault range at step 305. The pre-determined fault range is used as a safety mechanism for the wheelchair. In this exemplary embodiment, the range is 1 V less than and 1 V above the stored neutral value. As long as the INPUT signal is within this range, the wheelchair will operate and instruct the wheelchair to move at step 307. Here, Thereafter, microcontroller 14 will continue monitoring INPUT signals at step 301.

If, however, the INPUT signal is outside the predetermined fault range, microcontroller 14 outputs a FAULT signal and the wheelchair will cease operation at step 306. In this exemplary embodiment, the FAULT signal is a NEUTRAL signal. Thereafter, in this embodiment, joystick 10 must be serviced in order to be used again. Those ordinarily skilled in this art having the benefit of this disclosure realize a variety of fault ranges may be utilized as desired.

In relation to FIG. 1, operation of the wheelchair will now be explained according to an exemplary embodiment of the present invention. When the user desires to use the wheelchair, he applies pressure to pressure based joystick 10. This pressure may be applied by a tongue, chin, hand, etc. Circuitry in joystick 10 converts the pressure into a corresponding voltage out which is transmitted to interface 12 as the INPUT signal. The INPUT signal is the filtered by low pass filter 18, buffered by amplifier 20, and feed into A/D converter 22, where it is converted from analog to digital format. Thereafter, microcontroller 16 retrieves the stored neutral value from memory 24 and compares it to the INPUT signal. Once microcontroller 14 (via implementation of software 16) verifies the INPUT signal is in the specified ranges as previously described, microcontroller checks the sensitivity adjustment knob (which can be adjusted by the user) and utilizes a transfer function to convert in INPUT signal into the associated OUTPUT signal. An exemplary transfer function is shown below and is illustrated graphically in FIG. 4.

Slope=½ MaxOutput/(Sensitivity)

Yintercept=(Slope×(Sensitivity−Initial Neutral Values))+(Neutral Output−(Max Output/2))

Output Value=(Slope×Joystick−Axis)+Yintercept

Figure 4:
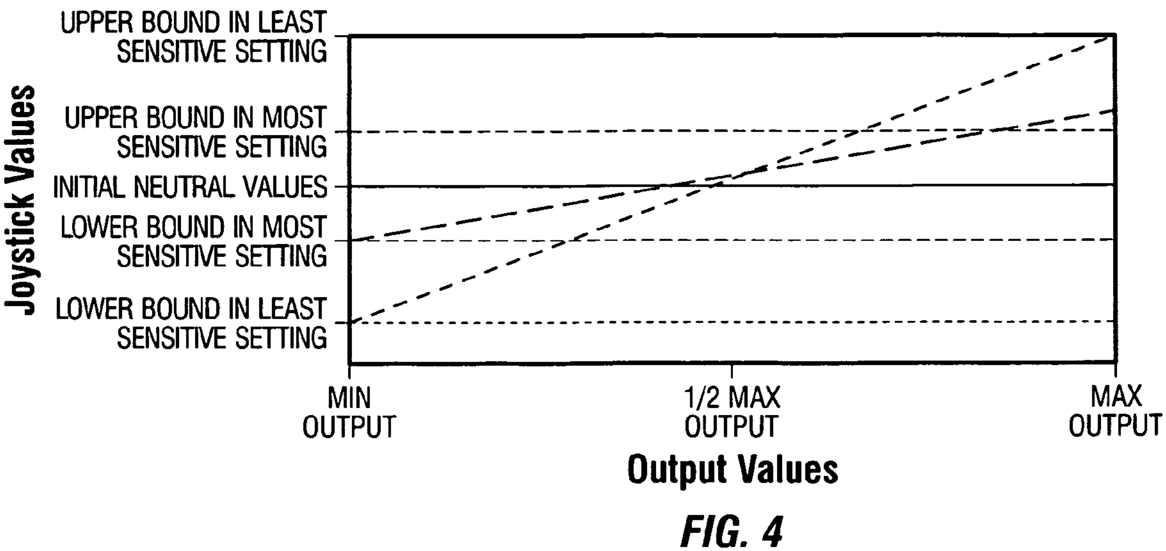
FIG. 4 is a chart graphically plotting the joystick input values vs. the output values along various joystick sensitivity settings using an exemplary embodiment of the present invention.

As illustrated in FIG. 4, the higher the sensitivity settings the less change in joystick value (i.e., INPUT signal) relative to the neutral value is required to move wheelchair—and vice versa for lower sensitivity settings. Thus, software module 16 of microcontroller 14 allows for adjustment of the sensitivity of joystick 10. This is accomplished by reading the voltage INPUT signal of the potentiometer (in joystick 10) using microcontroller 14. The INPUT signal is then used by microcontroller 14 to change the slopes of the sensitivity lines shown in chart 1. The change in slope reflects how the INPUT and OUTPUT signals are related. So, at a high sensitivity setting, a small change in the INPUT signal voltage would create a large change in the output of the pulse width modulated ("PWM") duty cycle (i.e., OUTPUT signal), and at a low sensitivity setting, a large change in the INPUT voltage signal would created a small change in the output of the PWM duty cycle (i.e., OUTPUT signal).

In this exemplary embodiment, there are additional safety mechanism built into interface 12. Referring to FIG. 1, if the joystick cable (not shown) is inadvertently removed from interface 12, input filter 18 will be pulled down to ground by pull down resistors R1 and R2 coupled to the output of amplifier 20. After the value of the INPUT signal is calculated, the value is compared to the dead band neutral values and the fault range values. If the value of the INPUT signal is outside of these parameters, the device goes into neutral or fault as previously described.

Once the INPUT signal is determined to be within the specified deadband and fault ranges, a PWM signal generated by microcontroller 14 (i.e., OUTPUT signal) flows through active low pass filter 26 and amplifier 28. Low pass filter 26 creates a DC voltage by filtering out the high frequencies and allowing lower frequencies to pass. In this exemplary embodiment, filter 26 is designed to filter out any frequencies above 5 Hz. A 10 uF 5% precision ceramic capacitor and 3 k 1% precision thick film resistor may form each stage of the filter 26. With two stages of the RC filter for each output, the ripple is less than 5 mV. Amplifier 28 doubles the DC output voltage to match what the wheelchair specification requires. It also acts as an output buffer. The analog OUTPUT signal is then sent to the wheelchair port as well as read back into microcontroller 14 using the feedback voltage divider circuit 30 as a double check. Those ordinarily skilled in this art having the benefit of this disclosure realize that various other circuitry may be utilized in conjunction with or in place of those described herein.

Through use of the present invention, the pressure-based joystick 10 requires less than 1 mm of movement and less than 10 grams of force to operate. Accordingly, individuals with muscular degenerative disabilities having very little strength and lack of mobility can drive the wheelchair for extended time periods without fatigue.

Figure 5:
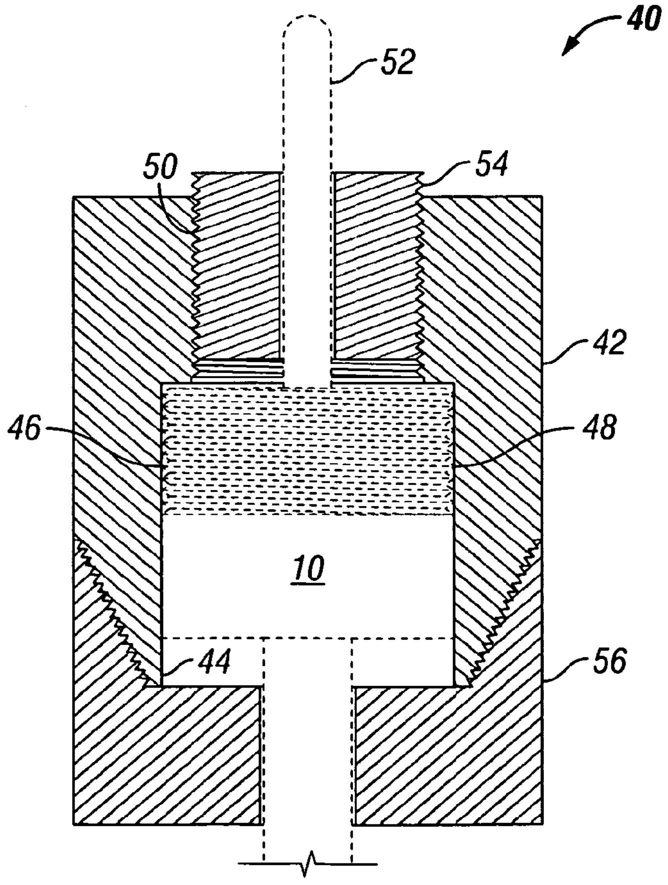
FIG. 5 is a sectional view of a joystick sleeve according to an exemplary embodiment of the present invention.

FIG. 5 illustrates a mounting sleeve for joystick 10 according to an exemplary embodiment of the present invention. Sleeve 40 comprises a body 42 having a bore 44 there through. At the lower end of bore 44, there is a shoulder 46 which forms the diameter of the upper end of bore 44 (which is smaller than the lower end of bore 44). Threads 48 surround inner bore below shoulder 46, while threads 50 surround the inner diameter of bore 44 above shoulder 46. Body 42 is made of a hard metal, which is aluminum in this exemplary embodiment. However, other metals or sufficiently rigid materials may utilized.

During construction, pressure based joystick 10 is inserted into the lower end up into bore 44 until it comes into contact with shoulder 46. Joystick 10 comprises threads on its outer surface to mate with threads 48. Sensor 52 extends distally from the body of joystick 10 as shown. Thereafter, a nut 54 is fitted atop sensor 52 and screwed into the upper end of bore 44 using threads 50 (along with mating threads on the outer surface of nut 54). Thereafter, a cap 56 is screwed onto the bottom of body 42 via threads. In this exemplary embodiment, cap 56 is a strain relief having a hole in the center, as shown. The joystick plug is threaded through the hole and, then, cap 56 is screwed into place, creating an air tight seal. Accordingly, sleeve 40 provides durability to joystick 10.

Accordingly, an exemplary methodology of the present invention provides a processor implemented method for using an interface for use with a pressure-based wheelchair joystick, the method comprising the steps of: detecting a calibration input signal by a microcontroller, the calibration input signal being received from the pressure-based wheelchair joystick; initiating an idle state for a predetermined period of time; determining whether the calibration input signal is still being detected at the microcontroller; continuing to detect the calibration input signal; determining a deadband using the detected calibration input signal, wherein this step further comprises the steps of: determining a lower threshold with respect to the detected calibration input signal; and determining an upper threshold with respect to the detected calibration input signal, wherein the lower and upper thresholds represent the deadband; and storing the deadband as a neutral range value. In another exemplary methodology, the lower threshold is determined to be minus 24 mV from the detected calibration input signal, and the upper threshold is determined to be plus 24 mV from the detected calibration input signal.

Another exemplary methodology of the present invention provides a processor implemented method for using an interface for use with a pressure-based wheelchair joystick, the method comprising the steps of: detecting a first input signal by a microcontroller, the first input signal having a corresponding value, wherein the first input signal is received from the pressure-based wheelchair joystick; retrieving a neutral range value from memory; verifying that the value of the first input signal is outside the neutral range; verifying that the value of the first input signal is within a fault range; and transmitting an output signal to a wheelchair, the output signal corresponding to the value of the first input signal. In another methodology, the step of verifying the value of the first input signal is outside the neutral range further comprises the step of detecting a second input signal if the value of the first input signal is within the neutral range. In yet another methodology, the step of verifying that the value of the first input signal is within a fault range further comprises the step of outputting a fault signal if the value of the first input signal is outside the fault range. In yet another methodology, the method further comprises the step of deactivating the wheelchair in response to the fault signal.

An exemplary embodiment of the present invention provides a non-transitory computer readable medium containing a computer program product for interfacing a pressure-based joystick with a wheelchair, the computer program product comprising instructions for executing the steps of detecting a calibration input signal by a microcontroller, the calibration input signal being received from the pressure-based wheelchair joystick; initiating an idle state for a predetermined period of time; determining whether the calibration input signal is still being detected at the microcontroller; continuing to detect the calibration input signal; determining a deadband using the detected calibration input signal, wherein this step further comprises the steps of: determining a lower threshold with respect to the detected calibration input signal; and determining an upper threshold with respect to the detected calibration input signal, wherein the lower and upper thresholds represent the deadband; and storing the deadband as a neutral range value. In another exemplary embodiment, the lower threshold is determined to be minus 24 mV from the detected calibration input signal, and the upper threshold is determined to be plus 24 mV from the detected calibration input signal.

Another exemplary embodiment of the present invention provides a non-transitory computer readable medium containing a computer program product for interfacing a pressure-based joystick with a wheelchair, the computer program product comprising instructions for executing the steps of: detecting a first input signal by a microcontroller, the first input signal having a corresponding value, wherein the first input signal is received from the pressure-based wheelchair joystick; retrieving a neutral range value from memory; verifying that the value of the first input signal is outside the neutral range; verifying that the value of the first input signal is within a fault range; and transmitting an output signal to a wheelchair, the output signal corresponding to the value of the first input signal. In another exemplary embodiment, the step of verifying that the value of the first input signal outside the neutral range further comprises the step of detecting a second input signal if the value of the first input signal is within the neutral range. In another embodiment, the step of verifying that the value of the first input signal is within a fault range further comprises the step of outputting a fault signal if the value of the first input signal is outside the fault range. In yet another exemplary embodiment, the steps further include deactivating the wheelchair in response to the fault signal.

An exemplary embodiment of the present invention provides an interface for use with a pressure-based wheelchair joystick, the interface comprising: a microcontroller to implement instructions in response to input signals received from the pressure-based wheelchair joystick, the instructions comprising the steps of: detecting a calibration input signal received from the pressure-based wheelchair joystick; initiating an idle state for a predetermined period of time; determining whether the calibration input signal is still being detected; continuing to detect the calibration input signal; determining a deadband using the detected calibration input signal; and storing the deadband as a neutral range value; a first filter coupled to an input of the microcontroller; an amplifier coupled to an output of the microcontroller; and a voltage divider circuit coupled to an output of the amplifier to feed an output signal back into the microcontroller.

Yet another exemplary embodiment of the present invention provides an interface for use with a pressure-based wheelchair joystick, the interface comprising: a microcontroller to implement instructions in response to input signals received from the pressure-based wheelchair joystick, the instructions comprising the steps of: detecting a first input signal by the microcontroller, the first input signal having a corresponding value, wherein the first input signal is received from the pressure-based wheelchair joystick; retrieving a neutral range value from memory; verifying that the value of the first input signal is outside the neutral range; verifying that the value of the first input signal is within a fault range; and transmitting an output signal to a wheelchair, the output signal corresponding to the value of the first input signal; a first filter coupled to an input of the microcontroller; an amplifier coupled to an output of the microcontroller; and a voltage divider circuit coupled to an output of the amplifier to feed an output signal back into the microcontroller.

Although various embodiments and methodologies have been shown and described, the invention is not limited to such embodiments and methodologies and will be understood to include all modifications and variations as would be apparent to one skilled in the art. For example, software module 16 may also comprise a timer interrupt to ensure the OUTPUT signal is changed periodically, thereby signaling the interface is working properly. Therefore, it should be understood that the invention is not intended to be limited to the particular forms disclosed. Rather, the intention is to cover all modifications, equivalents and alternatives falling within the spirit and scope of the invention as defined by the appended claims. Also, note the term “non-transitory” computer-readable medium comprises all computer-readable media, with the sole exception being a transitory, propagating signal.

I claim:

1. A processor implemented method for using an interface for use with a pressure-based wheelchair joystick, the method comprising the steps of:

(a) a microcontroller detecting a voltage signal sent from a calibration button located on a wheelchair interface and wherein the voltage signal is sent when a pressure-based wheelchair joystick is in a neutral state;

(b) the microcontroller initiating an idle state for a predetermined period of time upon detection of the voltage signal sent from the calibration button;

(c) the microcontroller pausing for the predetermined period of time, the microcontroller determining whether a calibration button is being pressed by determining if a voltage signal sent from the calibration button is detectable;

(d) the microcontroller detecting a neutral input signal sent from the pressure-based wheelchair joystick when the wheelchair joystick is in a neutral position, wherein the microcontroller stores the neutral input signal as an initial value for each axis of the pressure-based wheelchair joystick (e) the microcontroller determining a deadband using the detected input signal, wherein the deadband is a range including a minimum value that is defined as the input signal minus 24 milliVolts and a maximum value that is defined as the input signal plus 24 milliVolts;

(f) storing the deadband as a neutral range value;

(g) a microcontroller detecting a first input signal, the first input signal having a corresponding value, where the first input signal is received from the pressure-based wheelchair joystick;

(h) the microcontroller determining if the first input signal is outside the neutral range value;

(i) the microcontroller verifying that the value of the first input signal is outside the neutral range;

(j) the microcontroller transmitting an output signal to a wheelchair, the output signal corresponding to the value of the first input signal;

(k) the microcontroller verifying that the value of the first input signal is within a predetermined fault range;

(l) the microcontroller outputting a signal if the value of the first input signal is outside the fault range; and (m) the microcontroller deactivating the wheelchair in response to the first input signal being within the predetermined fault range.

2. A processor implemented method as defined in claim 1, wherein step (h) further comprises the step of the microcontroller detecting a second input signal if the value of the first input signal is within the neutral range.

3. An interface for use with a pressure-based wheelchair joystick, the interface comprising:

(a) a microcontroller to implement instructions in response to input signals received from the pressure-based wheelchair joystick, the instructions comprising the steps of:

1. detecting a voltage signal received when a calibration button on the pressure-based wheelchair is pressed, wherein the voltage signal is received when the pressure-based wheelchair joystick is in a neutral position;
2. initiating an idle state for a predetermined period of time;
3. determining whether the voltage signal is still being sent;
4. upon determining that the voltage signal is still being sent, receiving an input signal;
5. determining a deadband using the detected input signal;
6. storing the deadband as a neutral range value and wherein the neutral range includes a minimum value that is defined as the input signal minus 24 milliVolts and a maximum value that is defined as the input signal plus 24 milliVolts;
7. detecting a first input signal, the first input signal having a corresponding value, where the first input signal is received from the pressure-based wheelchair joystick;

8. determining if the first input signal is out of the neutral range value;
9. verifying that the value of the first input signal is outside the neutral range;
10. transmitting an output signal to a wheelchair, the output signal corresponding to the value of the first input signal;
11. verifying that the value of the first input signal is within a predetermined fault range;
12. outputting a signal if the value of the first input signal is outside the fault range; and
13. deactivating the wheelchair in response to a fault signal (b) a first filter coupled to an input of the microcontroller;
(c) an amplifier coupled to an output of the microcontroller; and
(d) a voltage divider circuit coupled to an output of the amplifier to feed an output signal back into the microcontroller.

* * * * *